May 13, 1952
I. E. MUSKAT
2,596,162
METHOD OF POLYMERIZING FIBER-REINFORCED
RESINOUS MATERIALS AND PRODUCT
Filed March 1, 1945
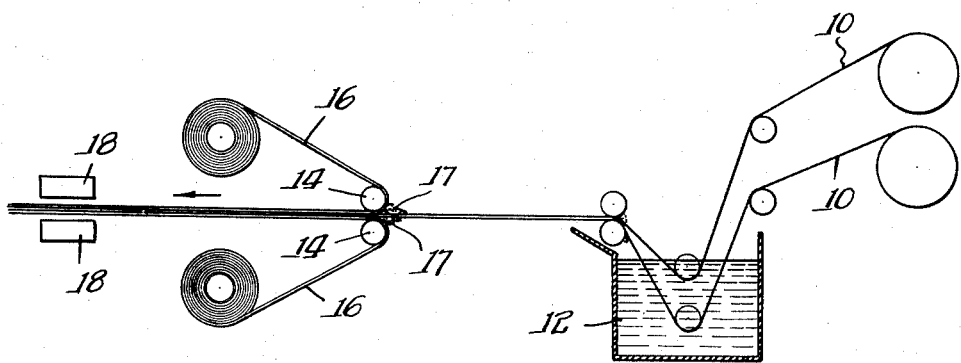
INVENTOR.
Irving E. Muskat
By: Schneider & Dressler
attys.

Patented May 13, 1952

2,596,162

UNITED STATES PATENT OFFICE 2,596,162

METHOD OF POLYMERIZING FIBER-REINFORCED RESINOUS MATERIALS AND PRODUCT

Irving E. Muskat, Plainfield, N. J., assignor to Marco Chemicals, Inc., a corporation of New Jersey Application March 1, 1945, Serial No. 580,474

18 Claims. (Cl. 154—110)

This invention relates to a method of preparing fiber-reinforced resinous parts, and, particularly, to a method of making shaped laminated resin sheets or parts. It also relates to novel articles of manufacture in the form of laminates in a partially cured state and to methods of forming such laminates.

It is known to form laminated fabric sheets or other elements by impregnating a plurality of assembled sheets with resin and curing the assemblage in a press under high pressure, in the order of about 1,000 to 2,000 pounds per square inch and even higher. Such processes are often objectionable because of the expensive equipment required and further because products of limited size and shape only can be produced due to the high pressures which must be developed.

More recently certain laminated resinous parts have been formed without substantial pressure by inserting a stack of impregnated sheets between a pair of glass sheets and curing the assemblage. In such a case the products obtained often are irregularly impregnated and contain insufficient or excessive resin and exhibit unsightly blemishes, drain marks, blisters and similar defects which weaken the laminate or otherwise impair its use. Furthermore the breakage of glass in the process is often so serious as to make the process unfeasible from a commercial standpoint.

Use of metal plates in lieu of the glass in such a process has not proven satisfactory due to the greater weight of such parts and the greater tendency to produce defective products, since the metal plates are opaque and the formation of defects cannot be readily detected.

The problem is particularly acute when fabric sheets or parts of a curved or similarly shaped cross section are produced by this method, since the mating molds used must fit accurately and often slight inaccuracies in the shape of the molds will cause production of products which are defective due to drainage, wrinkles, blister formation, etc.

In order to avoid the expense of accurately machined pairs of mating molds, shaped resin laminates have been prepared by laying an impregnated fibrous sheet or stack of sheets upon a mold of desired shape or contour, enclosing the mold and the fibrous sheets in a rubber bag and evacuating the bag. This process requires the use of a specially prepared bag of substantial weight in order to withstand the differential pressure established by the evacuation and, moreover, the bags can be used for a limited number of times only before breaking down under the curing temperatures. Furthermore, the bags generally must be constructed to a special shape for each type of part. Consequently the process is objectionably expensive. In addition, the production of articles which are uniformly impregnated with a controlled amount of resin is difficult.

In accordance with the present invention resin bonded fibrous laminated sheets of large size or laminated products of a wide variety of shapes or contours may be produced without the drainage, blemish formations and irregular impregnations encountered in many prior art processes, and without use of expensive presses and molds usually required in laminating processes. These laminates may be produced without pressure or with low pressures up to about 300 pounds per square inch, as desired. They may also be produced with higher pressures, but such high pressures are not necessary and, in many instances, are objectionable.

In accordance with the process of my invention, a fibrous base is impregnated with a polymerizable liquid comprising a compound containing at least two polymerizable unsaturated groups, then placed in a nonporous envelope, at least one wall of which is constructed of a light and flexible material such as cellophane, and the flexible wall is forced or pressed against the impregnated base to squeeze out entrapped air as hereinafter described. Thereafter the base is subjected to heat and/or light to partially polymerize the liquid polymerizable material. This polymerization is continued until a solid or semi-solid, essentially immobile polymer is obtained, and polymerization is interrupted or discontinued while the polymer possesses relatively little rigidity and, preferably, while it is adhesive. The impregnated base enclosed in cellophane or similar material and containing the solid or semi-solid polymer in an immobile state may be shaped to any desired form or may be cut into lengths, segments or sections and these sections may be cured while holding them in the shape which it is desired to impart thereto. Flat, bent or curved parts of any convenient shape may be obtained in this manner without drainage and without other difficulties usually encountered in other processes.

In enclosing and compacting the fibrous base it is found advantageous to conduct the process in a manner such that excess monomer and entrapped air are swept in a direction laterally with respect to the cellophane cover to a region adjacent to the edges of the fabric. Preferably the squeezing or compacting is effected by rolling or application of other squeezing pressure which moves from an interior portion of the impregnated base toward an edge thereof whereby the excess polymerizable liquid and entrapped air is positively forced to the edge of the fabric, as described in my copending application Serial No. 526,776, filed March 16, 1944. By means of this squeezing pressure the flexible sheet or envelope is forced into intimate contact with the fibrous base and by control of the degree of pressure applied it is possible to control the resin content of the ultimate product. The sheet thus compacted adheres closely to the flexible cover, the cover being at least partially held in place by atmospheric pressure and partially by the adhesion of the impregnated base to the cover. Consequently, after the removal of the air and excess polymerizable liquid the envelope is effectively held against the impregnated fabric and the compacting and squeezing pressure may be released completely or reduced substantially to a pressure sufficient to hold the layers of laminate in place. The polymerizable liquid forced to the edges effectively seals the assemblage against reentry of air into a central portion of the fibrous base. The assemblage may be then polymerized while the seal is maintained, until a solid or semi-solid polymer in an immobile state has been secured. The polymerization may be effected without pressure, or with a very low unsubstantial pressure in the order of about ⅓ to 15 or more pounds per square inch, or with other low pressures up to about 300 pounds per square inch, as desired.

In accordance with an effective method of carrying out the invention, a more or less continuous fibrous web or plurality of webs may be impregnated, assembled and covered as herein contemplated. In this process the impregnated base is passed between a pair of rolls which simultaneously roll out excess liquid and entrapped air from the base and apply flexible cover sheets to the top and underside of the web, either simultaneously or successively. In order to avoid or minimize air entrapment underneath the cover sheet a bead or other body of polymerizable liquid is established and maintained between and in contact with both the surface of the impregnated web and the cellophane sheet being applied to such surface. This bead serves as a liquid seal which is in contact with the web until the cellophane is applied to the web and passes therewith through the rolls. Such a seal serves to exclude air which might otherwise be entrapped.

The process is most effectively carried out when the polymerizable liquid used is comparatively viscous, i. e., a viscosity at room temperature of 500 and preferably 1000 centipoises or above, since with such liquids the prevention or minimization of substantial air entrapment and maintenance of the sealing pool or bead of liquid is comparatively easy. With somewhat less viscous materials, more difficulty may be encountered in preventing air entrapment and in maintaining the sealing bead, particularly on the underside of the sheet. This difficulty may be compensated for to a degree at least by increasing the rate of passage of the sheet through the rollers and/or the angle at which the cellophane sheet approaches the roller. Liquids which are excessively fluid may be thickened by partial polymerization to a suitable viscosity. Thus it is possible to conduct the operation with relatively fluid liquids having a viscosity at room temperature of as low as 75 centipoises or even lower, although with such fluid liquids more or less air may be included underneath the cellophane cover and, occasionally, the amount of entrapped air may be so excessive that subsequent operations may be required for its removal.

The invention may be more fully understood by reference to the accompanying drawing which is a diagrammatic view of a method of making the laminates in sheet form.

In the process illustrated a sheet or plurality of fibrous sheets 10 may be impregnated with a polymerizable liquid by passing the sheet or sheets through a tank 12 containing the polymerizable liquid. Where a plurality of such sheets are impregnated the sheets may be superimposed. The impregnated sheet or laminate may then be passed through rolls 14 which simultaneously squeeze out excess polymerizable liquid and entrapped air and apply cellophane or similar cover sheets 16 to the impregnated web, sealing the cover sheets to the surface of the laminate and effectively forming an enclosure therefor. When the cover sheets overlap the laminate the latter is enclosed in an essentially airtight envelope as described in my above-mentioned copending application.

The amount of polymerizable liquid within the pores of the impregnated base and the pressure applied by rolls 14 are correlated so as to establish and maintain a bead or body of polymerizable liquid 17 immediately in front of the rollers and in contact with the cellophane and the fibrous base immediately before the two pass between the rolls. This bead serves to prevent or minimize entrapment of air between the cover and the base, acting as a form of liquid seal for this purpose. A similar bead of polymerizable liquid is also formed along each lateral edge of the fibrous base where the cover sheets overlap the base.

The assemblage so obtained is then moved to a suitable source of heat 18 which may comprise an oven, infra red lamps or other heating means. This polymerization is continued until a polymer which is solid or essentially immobile, but which possesses relatively little rigidity, has been secured. Preferably polymerization is discontinued while the polymer is adhesive or tacky. Such a polymer may be in the form of a very viscous immobile liquid or a gel containing a portion generally not more than about 70 per cent and often less than 30 per cent by weight of insoluble polymer based upon the weight of polymerizable components in the fabric.

It has been found that upon polymerization of liquid compounds containing two or more polymerizable, unsaturated, unconjugated groups polymerization proceeds through a series of stages. In the initial stages the liquid becomes increasingly viscous and becomes more or less tacky. Such liquids comprise a solution of unpolymerized liquid and a soluble partial polymer. As polymerization continues the product sets up in the form of a gel which contains both a component which is insoluble in or only swellable with organic solvents and a polymerizable component which is soluble in organic solvents. In the early stages this gel is adhesive or tacky but as further polymerization takes place the gel loses its adhesive property and is converted to a less flexible polymer containing approximately 30 per cent or more of insoluble polymer. Upon further polymerization the polymer is converted to an essentially infusible, insoluble state in which it is generally rigid and strong.

In accordance with the present invention polymerization is interrupted before the rigid final polymer is secured and, preferably, while the polymer is tacky or adhesive. It has been found that a liquid which is tacky and which adheres to a surface with sufficient tenacity to string out when pulled away from the surface is much more effective than are more oily polymerizable liquids which do not exhibit this tendency to string out.

Particularly useful polymerizable liquids for this purpose are the polyfunctional, oxygen-convertible esters of unsaturated dibasic acids such as maleic, fumaric, itaconic or citraconic acids or acetylene dicarboxylic acid and a polyhydric alcohol, particularly a dihydric alcohol, such as ethylene glycol, propylene glycol, isobutylene glycol, 1,3-trimethylene glycol, hexamethylene glycol, glycerol, methyl glycerol, phthalyl alcohol or polyhydroxy polymers of these alcohols containing up to 4 polyhydric alcohol units such as diethylene glycol, triethylene glycol, tetraethylene glycol, dipropylene glycol, polyglycerol, etc. These esters are comparatively high in molecular weight, contain at least two units of the dibasic acid and the polyhydric alcohol and are very adhesive. Such esters may include the alkyds such as ethylene glycol maleate, ethylene glycol fumarate and ethylene glycol itaconate, formed by reaction of ethylene glycol with the unsaturated acid to an advanced stage of esterification, for example, to an acid number of 50 or below. They may also include mixed esters in which monohydric alcohols (methyl, ethyl, allyl, methallyl, propyl or tetrahydrofurfuryl alcohol) and/or monobasic acids (acetic, propionic, oleic, stearic acids, etc.) are incorporated in the reaction mixture.

In addition, polyhydric alcohol unsaturated polycarboxylic acid esters formed by reaction of glycol maleate, diethylene glycol fumarate or similar esters having an acid number of 150 or below with a monohydric alcohol such as methyl, benzyl, ethyl or propyl alcohol in amount such that the alcohol introduced exceeds that accountable for by reduction in acid number may also be used. Such esters and the preparation thereof are described in a copending application for Letters Patent, Serial No. 520,319, filed January 29, 1944, by Charles Gould, now Patent No. 2,418,633, which is assigned to the same assignee as the instant application.

Often these polyhydric alcohol esters are found to be unduly viscous per se and, accordingly, impregnation of fibrous bases with such esters is very difficult. In many cases it is found advantageous to blend such esters with less viscous polymerizable liquids, including methyl methacrylate, styrene, vinyl acetate, ethyl itaconate, methyl alpha chloroacrylate, diallyl or dimethallyl esters including allyl carbonate, allyl phthalate, allyl maleate, allyl fumarate, allyl succinate, allyl adipate, or other corresponding polymerizable unsaturated alcohol polyesters or other compounds including divinyl benzene, glycol dimethacrylate, allyl methacrylate, allyl crotonate, etc. The amount of such diluting polymerizable liquid will be dependent upon the actual viscosity of the glycol ester used and should not be in such excess that the resulting mixture has a viscosity below about 500–1000 centipoises at room temperature. Usually the viscosity of the mixture will be about 1500–3000 centipoises and the mixture will contain less than 25 per cent by weight of the diluting liquid.

While the invention is particularly adapted to use in connection with polymerizable unsaturated esters of a polyhydric alcohol and an unsaturated dibasic acid, it may also be applied to use in connection with less viscous materials although the problem of securing proper sealing may be somewhat more difficult. For example the process may be applied to the following classes of polymerizable materials.

1. Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic, methacrylic, alpha or beta chloracrylic, crotonic or cinnamic acids, including allyl acrylate, allyl alpha chloracrylate, etc.

2. Polymerizable unsaturated alcohol polyesters of polybasic acids such as phthalic, carbonic, oxalic, succinic, adipic, azalaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate) and mixtures thereof.

3. Polyhydric alcohol esters of the above unsaturated acids and polyhydric alcohols such as ethylene glycol, diethylene glycol, propylene glycol, dipropylene glycol, triethylene glycol, hexaethylene glycol, glycerol, sorbitol and mannitol, including ethylene glycol diacrylate, etc.

4. Polymerizable ethers, including divinyl ether, etc. and copolymers of the ethers and any of the above compounds.

5. Other organic compounds containing two or more unsaturated, unconjugated groups, including divinyl benzene, divinyl naphthalene, vinyl acetylene, divinyl acetylene, etc.

Other liquid polymerizable or condensible materials capable of curing to a thermosetting state, including glycerol phthalate, liquid phenol-aldehyde resins, melamine-aldehyde condensation products and urea condensation products in admixture with the above compounds containing two or more polymerizable groups may also be used in accordance with the present invention.

Liquid compositions which are too fluid for use as such may be partially polymerized or blended with more viscous materials to secure compositions of suitable viscosity which, in general, should not be below about 50 to 75 centipoises at room temperature and, preferably, should be substantially above this value. Solid polymerizable compositions may be dissolved in polymerizable liquids for use as herein contemplated.

The above compositions are polymerized with heat and/or light, usually in the presence of catalysts such as benzoyl peroxide, acetone peroxide, lauroyl peroxide or methyl ethyl ketone peroxide.

The exact time required to secure such an immobile polymer varies widely with the activity of the polymerizable liquid and the temperature of polymerization. With actively polymerizable materials such as mixtures containing a preponderance of ethylene glycol maleate or ethylene glycol fumarate or other glycol unsaturated dibasic acid ester mixed with up to 50 per cent of styrene, diallyl maleate, diallyl phthalate, diallyl carbonate or similar diallyl or dimethallyl ester, polymerization may be effected by heating in the presence of benzoyl peroxide at 80–90° C. for 10–20 minutes. On the other hand less active materials such as monomeric diallyl phthalate may require a longer time. This time may be shortened substantially by use of partially polymerized liquids.

The fibrous base partially polymerized as described above, may be shaped to any convenient form to produce flat or contoured parts. Sheets of the partially cured product may be sliced into lengths and laid upon flat plates or clamped in frames capable of holding the sheets horizontally and cured to completion, with low pressure or without pressure as described, whereby flat panels may be secured. Sections or lengths or segments of these sheets may be draped over a mold such as a cylindrical mandrel, a channel iron or an angle iron or other shape to form a cylindrical segment, a channel section, an angle section, or part of other shape or contour, and then cured to completion with or without pressure.

The method of my invention thus makes possible the production of a wide variety of flat or shaped parts without drainage or surface defects, in a simple economical manner, using only a simple male or female mold or a pair of mating molds of low cost. This method not only permits the use of low cost molds of simple construction, but also enables one to use special hand or machine shaping operations which are not feasible in high pressure fabrication processes. Sheets of large size and shaped parts of unusual contour or size which cannot be produced by the high pressure processes may be produced in accordance with my process.

Often it is desirable to store the partially cured sheets, while encased in the envelope, for substantial periods of time before use. In such a case it is usually desirable to incorporate in the polymerizable material a polymerization inhibitor such as hydroquinone, diphenyl amine, catechol, p-tertiary butyl catechol, cuprous chloride or other inhibitor. The amount of such inhibitor should be sufficient to stabilize the partial polymer against substantial polymerization at room temperature but insufficient to prevent polymerization at elevated temperatures, for example, above 75° C. Usually 0.01 to 0.25 per cent by weight of inhibitor is sufficient although the amount necessary will vary with the particular inhibitor and the amount of catalyst present.

Often it is desirable to cut the fabric and splice one or more layers thereof in order to curve the layers or to interleave or lap one over the other. This may be done without impairing the bond between the layers because of the adhesive character thereof which tends to readhere and rebond the layers upon further curing. Moreover such joints may be further bonded by coating them with a polymerizable monomer or syrupy polymer containing a peroxide catalyst in order to improve adhesion.

While the process is particularly advantageously conducted using two flexible cover sheets to form the non-porous envelope certain parts may be formed using other types of envelopes. For example a suitable envelope for many purposes may be formed by use of a single flexible sheet. In such a case the laminate may be laid upon a flat or curved rigid base as an aluminum or a glass plate and the cellophane cover sheet applied as described above to form a flexible envelope. Furthermore a bag may be made and the laminate placed within the bag and rolled out as described. Numerous other modifications will occur to those skilled in the art.

While the invention has been described with particular reference to the use of cellophane as a cover sheet it is not limited to this material since other flexible nonrigid sheets which are essentially nonporous or impermeable to the polymerizable liquid and/or to air and which are not dissolved by the polymerizing liquid may be used. For most cases such cover sheets should be capable of being wetted by the polymerizable liquid. In general, nonporous films or foils having a thickness of 0.05 inch or less are most suitable. Cellophane, polyvinyl alcohol films or foils, rubber, metal foil or other similar flexible thin sheets, etc., are found to be suitable. Such materials are normally nonadherent to the polymer and may be removed readily after the resin impregnated sheets are cured. Cellulose acetate or nitrate sheets or foils may be suitable in some cases but very often such foils adhere too readily to the polymerizable compound.

The process may be used to produce resinous parts from various types of fibrous materials such as sheets of cotton or wool fabrics, canvas, duck, muslin, linen, rayon or nylon fabrics, woven or felted glass fiber, asbestos, or cotton batting, etc. The process is especially effective in producing laminated products comprising a plurality of layers of the above materials. However, individual sheets of felted or woven fibrous material may be impregnated and polymerized as herein contemplated.

The following examples illustrate the invention:

*Example 1*

20 moles of maleic anhydride, 2 moles of phthalic anhydride, 22 moles of ethylene glycol and 0.1 per cent by weight of hydroquinone were placed in a round bottomed flask equipped with a mercury sealed stirrer, gas inlet and a 6 inch column attached to a Liebig condenser. The system was gas tight. The mixture was heated to 188° C. and heating continued for a period of 6 hours during which time the temperature rose to 200° C. and water was distilled off. Carbon dioxide was bubbled through the reaction mixture to establish a substantially inert atmosphere within the flask. The product thus secured had an acid number of about 115.

6.5 moles of normal propanol was added to the flask and the flask was attached to a reflux condenser which condensed the vapors evolved and returned them to the flask. The mixture was refluxed for 6 hours at a temperature gradually rising from 126 to 169° C. During this heating the mixture was agitated and carbon dioxide bubbled through to establish an inert atmosphere.

The product which had an acid number of 90 was heated under reflux for 3 hours with 6 per cent by weight of acetic anhydride. The resulting product was topped at a pressure of 2 to 4 mm. of mercury and a temperature of 185–200° C. for 7 hours. The resulting product had an acid number of 35.

70 parts by weight of the liquid obtained was mixed with 30 parts by weight of diallyl phthalate and 3 parts by weight of benzoyl peroxide. This liquid had a viscosity above 500 centipoises.

Sheets were impregnated with this mixture, covered and rolled to expel excess liquid and air as shown in Fig. 1. The enclosed sheet was then heated for 8 minutes at 85° C. by means of infra red lamps, at which time the laminate was flexible and the polymerizable mixture was in an immobile, gel state capable of further polymerization. The sheet, containing polymer in a solid or semi-solid tacky state, was then sliced and a segment thereof draped over a cylindrical mandrel. The shaped laminate was placed in an oven and heated for two hours at 115° C. Upon removal of the cellophane a strong relatively rigid, curved laminate was secured.

The process may be conducted in similar manner using 20 parts by weight of vinyl acetate or styrene and 1 part by weight of benzoyl peroxide in lieu of the diallyl phthalate and 3 parts by weight of benzoyl peroxide.

Likewise 1,2-propylene glycol or diethylene glycol may be substituted for ethylene glycol, and fumaric or itaconic acids for maleic anhydride.

Flat sheets may be prepared simply by placing the partially polymerized segment upon a flat plate and polymerizing.

*Example 2*

2120 grams of diethylene glycol and 1960 grams of maleic anhydride were placed in a flask and heated as in Example 1 at a temperature gradually rising from 172 to 184° C. over a period of 3 hours. This product was a very viscous liquid which had an acid number of 80.

3862 grams of this product and 488 grams of normal propanol were heated under a reflux condenser as in Example 1 and at reflux temperature for a period of 14 hours. The product was topped at 200° C. and a pressure of 1 mm. of mercury. The resulting product was a fairly fluid liquid having an acid number of 25.

Laminates were prepared from mixtures of this material with vinyl acetate, styrene or a diallyl ester such as diallyl phthalate, according to the process of Example 1.

*Example 3*

The process of Example 1 was repeated, using methanol in lieu of propanol and refluxing for 20 hours and a liquid product which polymerized to a somewhat harder polymer was obtained. Laminates were also prepared from this material.

*Example 4*

The process of Example 1 was repeated using an equivalent amount of ethyl alcohol in lieu of propanol. Refluxing was continued for 20 hours. Laminates obtained were similar in character to the product of Example 1. Similar results were secured using equivalent amounts of isobutanol. Normal butanol produced a somewhat softer polymer. When methanol is used in lieu of propanol a somewhat longer period of reflux is required. All of the polymerizable liquids obtained were less viscous than the glycol maleate subjected to treatment.

*Example 5*

Ethylene glycol maleate (formed by heating ethylene glycol with maleic anhydride until a product having an acid number of about 10 was secured) was diluted with sufficient vinyl acetate to reduce the viscosity to about 1200 centipoises and 1 per cent by weight of finely divided benzoyl peroxide was dissolved in the mixture.

Shaped cloth laminates were prepared using this material in accordance with the process of Example 1.

*Example 6*

Diallyl phthalate containing 5 per cent by weight of benzoyl peroxide was heated at 80 to 85° C. in a flask equipped with a stirrer and a 1 mm. glass tube provided with two spaced marks. At the beginning of the heating period and periodically thereafter the diallyl phthalate was drawn up into the tube and allowed to flow back, the time required for the liquid to flow between the two marks being observed with a stop watch. When the time required for the liquid to flow between the two marks had increased fifteen fold the syrup obtained was cooled to room temperature.

Sheets were laminated using the thickened diallyl phthalate according to the method of Example 1. The covered laminate was cured until the polymerizable material reached an immobile, adhesive state by heating at 100° C. for 20 minutes. The laminate was then sliced, shaped and cured as in Example 1.

Although the present invention has been described with particular reference to the specific details of certain embodiments thereof it is not intended that such details shall be regarded as limitations upon the scope of the invention, except in so far as included in the accompanying claims.

I claim:

1. A method which comprises impregnating a porous fibrous base with a polymerizable liquid comprising an oxygen-convertible compound having at least two unsaturated, unconjugated polymerizable groups, capable of curing to a rigid solid resinous state, enclosing the base in an envelope having at least one wall made of a flexible, nonporous material, pressing the flexible wall against the base to expel excess liquid and entrapped air from the base, partially polymerizing the impregnated base until an immobile polymer capable of further polymerization is produced, shaping the partially polymerized base before a rigid polymer is obtained and further polymerizing the shaped base until the polymer is cured to a rigid solid state.

2. A method which comprises impregnating a porous fibrous base with a polymerizable liquid comprising an oxygen-convertible compound having a least two unsaturated, unconjugated polymerizable groups, capable of curing to a rigid solid resinous state, enclosing the base in an envelope having at least one wall made of a flexible nonporous material, pressing the flexible wall against the base to expel excess liquid and entrapped air from the base, partially polymerizing the impregnated base until an immobile polymer capable of further polymerization is produced, slicing a section from the partially polymerized base and further polymerizing the base until the polymer is cured to a rigid solid state.

3. A method which comprises impregnating a porous fibrous base with a polymerizable liquid comprising an oxygen-convertible compound having at least two unsaturated, unconjugated polymerizable groups, capable of curing to a rigid solid resinous state, applying cellophane sheets to the opposite sides of the base, pressing the sheets against the base to force excess polymerizable liquid and entrapped air to the edges of the sheet and to envelop the base and seal the same against substantial reentry of air, partially polymerizing the base to form an adhesive, substantially immobile polymer, slicing a section from the base and polymerizing the section until the polymer is cured to a rigid solid state.

4. A method which comprises impregnating a porous fibrous base with a polymerizable liquid comprising an oxygen-convertible compound having at least two unsaturated, unconjugated polymerizable groups, capable of curing to a rigid solid resinous state, applying cellophane sheets to the opposite sides of the base, pressing the sheets against the base to force excess polymerizable liquid and entrapped air to the edges of the sheet and to envelop the base and seal the same against substantial reentry of air, partially polymerizing the base to form an adhesive, substantially immobile polymer, slicing a section from the base and bending and polymerizing the section until the polymer is cured to a rigid solid state.

5. A method which comprises impregnating a porous fibrous base with a polymerizable liquid comprising an oxygen-convertible compound having at least two unsaturated, unconjugated polymerizable groups, capable of curing to a rigid solid resinous state, passing the base between rolls which squeeze out excess polymerizable liquid and entrapped air while applying flexible, substantially impermeable covers to opposite sides of the base, minimizing inclusion of air under the cover by establishing and maintaining a bead of polymerizable liquid between and in contact with the cover and the surface of the base immediately in front of the rolls, partially polymerizing the base to form an immobile, adhesive polymer, slicing a section from the base while the polymer remains adhesive and further polymerizing the section until the polymer is cured to a rigid solid state.

6. The process of claim 5 wherein the polymerizable liquid has a viscosity of at least about 500 centipoises.

7. The process of claim 5 wherein the polymerizable liquid is an ester of a dihydric alcohol and an unsaturated polycarboxylic acid, said ester containing a plurality of polymerizable, unconjugated unsaturated groups.

8. The process of claim 5 wherein the flexible, nonporous material is cellophane.

9. The process of claim 5 in which the flexible covers overlap at the edges.

10. An article of manufacture comprising a fibrous base impregnated with a polymerizable, substantially immobile, tacky resinous partial polymer of an oxygen-convertible compound containing at least two polymerizable unsaturated unconjugated groups, and cover sheets about said impregnated base sealing the same from substantial contact with air.

11. An article of manufacture comprising a fibrous base impregnated with a polymerizable, adhesive, substantially immobile resinous partial polymer of an oxygen-convertible compound containing at least two polymerizable unsaturated unconjugated groups, and cellophane cover sheets about said impregnated base sealing the same from substantial contact with air.

12. An article of manufacture comprising a fibrous base impregnated with a polymerizable, adhesive, substantially immobile, resinous partial polymer of an oxygen-convertible compound containing at least two polymerizable unsaturated, unconjugated groups, and flexible, non-porous cover sheets about said impregnated base sealing the same from substantial contact with air.

13. The article set forth in claim 10 wherein the cover sheets are cellophane.

14. The article set forth in claim 12 wherein the cover sheets are cellophane.

15. The article set forth in claim 12 wherein the partial polymer contains a quantity of polymerization inhibitor sufficient to stabilize the partial polymer against substantial polymerization at room temperature.

16. The article set forth in claim 12 wherein the partial polymer contains a quantity of polymerization inhibitor sufficient to stabilize the partial polymer against substantial polymerization at room temperature and wherein the cover sheets are cellophane.

17. A method which comprises impregnating a porous fibrous base with an excess of a polymerizable liquid comprising an oxygen-convertible compound having at least two unsaturated, unconjugated polymerizable groups, capable of curing to a rigid solid resinous state, enclosing the base in an envelope having at least one wall made of a flexible, nonporous material, pressing the flexible wall against the base to expel excess liquid and entrapped air from the base, partially polymerizing the impregnated base until an immobile adhesive polymer, capable of further polymerization is produced, and then shaping and further polymerizing the base until the polymer is cured to a rigid solid state.

18. A method which comprises impregnating a porous fibrous base with a polymerizable liquid comprising an oxygen-convertible compound having a least two unsaturated, unconjugated polymerizable groups, capable of curing to a rigid solid resinous state, passing the base between rolls which squeeze out excess polymerizable liquid and entrapped air while applying flexible, substantially impermeable covers to opposite sides of the base, minimizing inclusion of air under the cover by establishing and maintaining a bead of polymerizable liquid between and in contact with the cover and the surface of the base immediately in front of the rolls, partially polymerizing the base to form an immobile, adhesive polymer, and then shaping and further polymerizing the base until the polymer is curved to a rigid solid state.

IRVING E. MUSKAT.

REFERENCES CITED

The following references are of record in the file of this patent:

UNITED STATES PATENTS

| Number | Name | Date |
| --- | --- | --- |
| 1,206,656 | Benedictus | Nov. 28, 1916 |
| 2,255,313 | Ellis | Sept. 9, 1941 |
| 2,311,518 | Caligari | Feb. 16, 1943 |
| 2,343,225 | Pray et al. | Feb. 29, 1944 |
| 2,370,562 | Meunier | Feb. 27, 1945 |
| 2,397,827 | Williams | Apr. 2, 1946 |
| 2,456,093 | Swedlow | Dec. 14, 1948 |

FOREIGN PATENTS

| Number | Country | Date |
| --- | --- | --- |
| 540,169 | Great Britain | Oct. 8, 1941 |
| 549,043 | Great Britain | Nov. 4, 1942 |

OTHER REFERENCES

Plastics Bulletin No. 2, August 10, 1942, Pittsburgh Plate Glass Co., pages 3, 4, 5.